United States Patent [19]

Kersker et al.

[11] 4,216,813

[45] Aug. 12, 1980

[54] RADIAL TIRE WITH A BELT STRUCTURE OF DIFFERENT REINFORCEMENT CORDS

[75] Inventors: Theodore M. Kersker, Akron; Grover W. Rye, Cuyahoga Falls, both of Ohio

[73] Assignee: The Goodyear Tire & Rubber Company, Akron, Ohio

[21] Appl. No.: 904,070

[22] Filed: May 8, 1978

Related U.S. Application Data

[63] Continuation-in-part of Ser. No. 786,704, Apr. 11, 1977, abandoned.

[51] Int. Cl.² ............................................. B60C 9/18
[52] U.S. Cl. ......................... 152/361 DM; 156/133
[58] Field of Search ..... 152/361 R, 361 FP, 361 DM, 152/354 R, 358, 360; 156/133, 110 R

[56] References Cited

U.S. PATENT DOCUMENTS

| | | | |
|---|---|---|---|
| 3,796,247 | 3/1974 | Martin | 152/361 R |
| 3,901,751 | 8/1975 | Wilson | 152/361 R X |
| 4,016,916 | 4/1977 | Ravagnami | 152/361 R |
| 4,142,568 | 3/1979 | Kleijweg | 152/361 R X |

*Primary Examiner*—Robert B. Reeves
*Assistant Examiner*—Gene A. Church
*Attorney, Agent, or Firm*—Frank Pincelli

[57] ABSTRACT

A radial tire having a belt structure reinforced with different cords, and a method of flat-band building such a tire. The belt structure comprises of at least one textile cord reinforced belt ply and a surrounding metal cord reinforced belt ply. The cords of said metal belt ply being highly elongatable during the toroidal shaping of the tire. The metal ply does not contribute substantially to the restricting action of said belt structure, but serves as a protective shield for the reinforcing belts.

23 Claims, 4 Drawing Figures

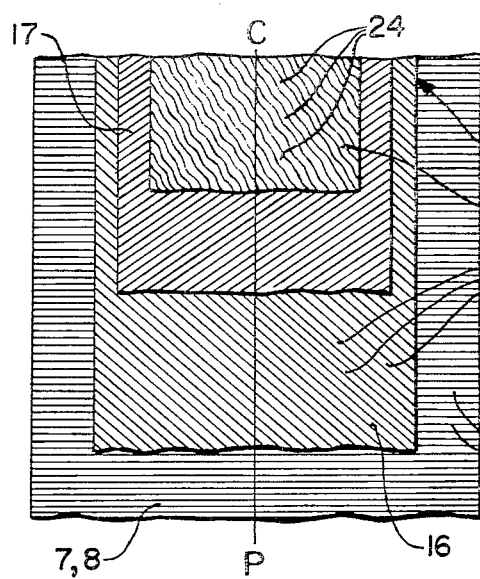
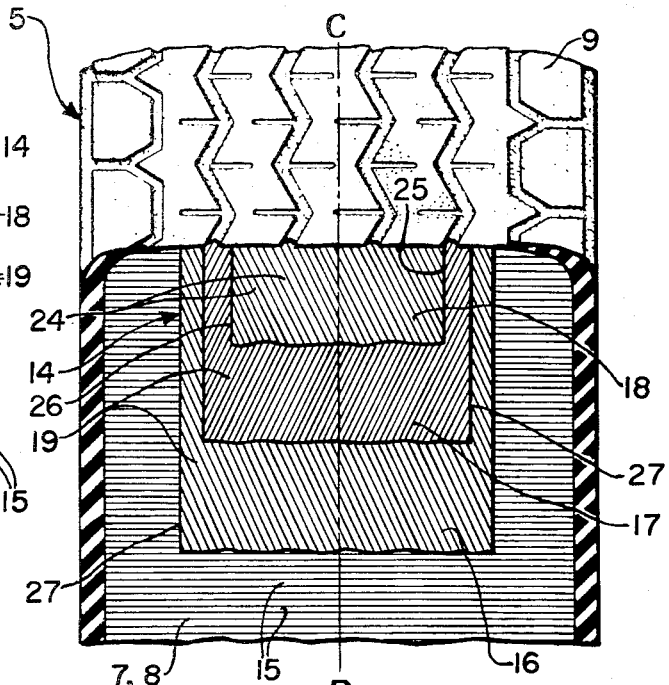
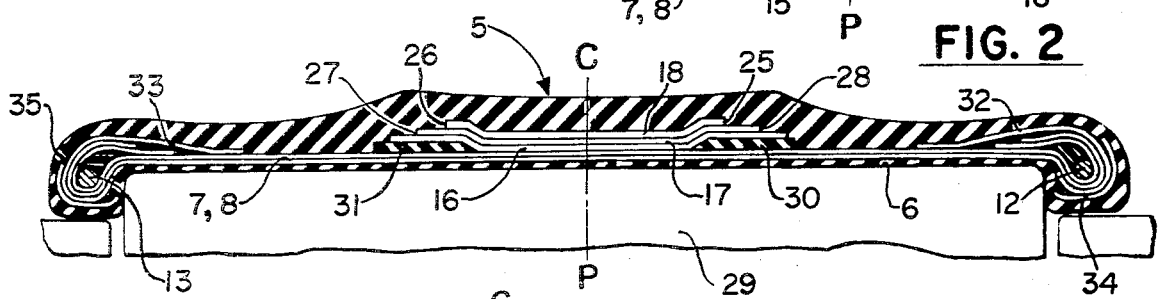
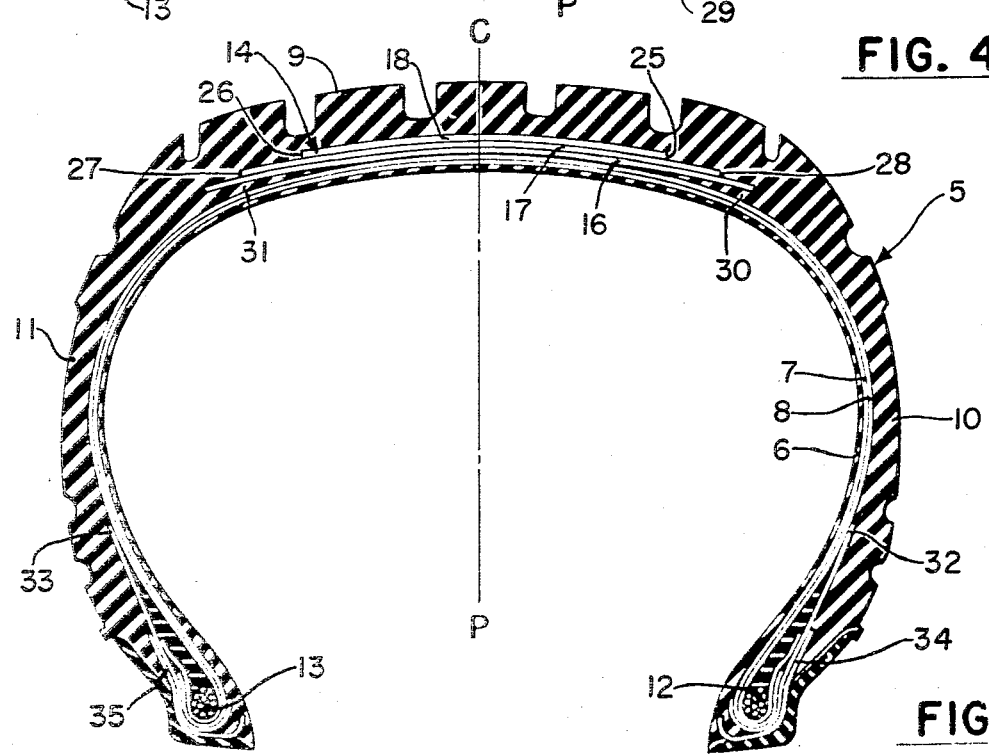

RADIAL TIRE WITH A BELT STRUCTURE OF DIFFERENT REINFORCEMENT CORDS

This application is a continuation-in-part of current application Ser. No. 786,704 filed Apr. 11, 1977, now abandoned.

BACKGROUND OF THE INVENTION

The invention relates to the building of a radial tire with a special belt structure, using the flat-band method of building a tire, wherein the unvulcanized components of the tire are successively wrapped on a cylindrical tire building drum, to produce a generally cylindrical, unvulcanized tire which is then toroidally expanded within a rigid mold where the tire is molded and vulcanized. The use of such a method creates problems during the toroidal shaping of the tire, because of the normally low cord angle of the inextensible reinforcement cords of the belt structure and consequent restrictive action in limiting the circumferential expansion of the tire, which is necessary to the molding of the tire. For this reason, radial tires are usually toroidally shaped before the belt structure and remaining components are positioned on the tire. These problems are magnified when belt reinforcement cords of different materials, especially cords having widely divergent moduli of elasticity, or tensile strengths, are used. The invention is directed to solving such problems.

Briefly stated, the invention is in a radial tire and method of building the tire utilizing the flat-band process. The tire comprises the following components of fluid-impervious innerliner, at least one carcass ply with radially oriented reinforced cords surrounding the innerliner, a tread and pair of sidewalls surrounding the carcass plies and terminating at a pair of annular beads, and a belt structure. The belt structure comprises of at least one belt ply reinforced with textile cords having a low modulus of elasticity compared to the modulus of elasticity of the reinforcement cords of a belt ply which surrounds the textile cords. The surrounding belt ply or high modulus cords thereof is highly elongatable during the toroidal shaping of the tire. The surrounding belt ply after the tire has been molded and vulcanized does not contribute substantially to the restrictive effect of the belt structure.

DESCRIPTION OF THE DRAWING

The following description of the inention will be better understood by having reference to the annexed drawings, wherein:

FIG. 1 is a section of a radial tire made in accordance with the invention; and

FIG. 2 is a plan view of the tire with a portion of the tread removed to show the cord angular relationships between the reinforcement cords of the carcass plies and belt structure; and FIG. 3 is a plan view of the same carcass plies and belt structure of the tire when unvulcanized; and FIG. 4 is a section of the unvulcanized tire on a cylindrical tire building drum.

DETAILED DESCRIPTION OF THE INVENTION

With particular reference to FIGS. 1 and 2 of the drawing, there is shown a radial tire 5 comprising the following components of: fluid-impervious innerliner 6; a plurality of carcass plies 7, 8 surrounding the innerliner 6; a tread 9 and a pair of sidewalls 10, 11 surrounding the carcass plies 7, 8 and terminating at a pair of inextensible annular beads 12, 13; and a belt structure 14 interposed between the tread 9 and radially outermost carcass ply 8 of the tire 5.

Each of the carcass plies 7, 8 of the tire 5 are reinforced with generally radially oriented cords; i.e. cords 15 disposed at angles in the range of from 75–90 degrees measured from the plane CP containing the mid-circumferential centerline of the tread 9, such plane herein and in the claims being referred to as the centerplane. The cord angles specified herein and in the claims are in relationship to a tire 5 which is vulcanized and uninflated. The radially oriented cord 15 of the carcass plies 7, 8 are composed of any suitable material; e.g. rayon, nylon, polyester, glass, metal or aramid. While the preferred embodiment discloses the use of two carcass plies, any desired number of carcass plies may be utilized.

The belt structure 14 of the radial tire 5 comprises of at least one textile cord reinforced belt ply and a surrounding metal cord reinforced belt ply. In the preferred embodiment, belt structure 14 comprises of three superimposed belts 16, 17, 18. The two radially innermost belts 16, 17 closest the readily outermost carcass ply 8, are reinforced with textile cords, e.g. cords 19. The term "textile cords", as used herein and in the claims, means cord composed of organic fibers such as rayon filaments, synthetic filaments of nylon or polyester. Such cords 19 generally have an initial modulus of elasticity which does not exceed 120 grams per denier. The initial modulus is measured by ASTM Procedure D885 Section 21.

The textile cords 19 of the two innermost belts 16, 17 are disposed at angles in the range of from 16–25 degrees relative to the centerplane. The two innermost belts 16, 17 comprise of two cut belts of reinforcement cords 19 which have the same angular disposition relative to the centerplane, but which extend in opposite directions from the centerplane, as best seen in FIG. 2. While belts 16, 17 are illustrated as being two cut belts, they may be constructed in any known manner; for example, the belts 16, 17 may be of the folded belt type construction and comprise of two belt plies of reinforcing cords which have the same angular disposition relative to the centerplane but which extend in opposite directions from the centerplane.

The radially outermost third belt 18 of the belt structure 14 comprises a single belt ply, or layer of reinforcement cords 24 made of a material which has an initial modulus of elasticity of at least 250 grams per denier; e.g. cords composed of glass, meta; or aramid. The initial modulus is measured by ASTM Procedure D885 Section 21.

The cords 24 of high modulus material of the radially outermost belt 18 are disposed at angles and a range of from 16–25 degrees relative to the centerplane, and extend in a direction from the centerplane opposite that of the textile cord 19 of the radially outermost ply of the closest belt 17. The longitudinal sides or edges 25, 26 of the radially outermost belt 18 are disposed laterally within the laterally innermost longitudinal edges 27, 28 of the belt 16, 17.

It should be appreciated that the high modulus reinforcement cords 24 will not, at the same load, be as elongatable as the textile cords 19, thereby creating a problem during the toroidal shaping of the tire 5 within a mold, wherein the tire 5 is molded and vulcanized. It is therefore desirable that the ply 18 of high modulus cord 24 be elongatable at least as much as the plies 16, 17 of textile cord during the shaping of the tire. The ply 18 is sufficiently elongatable such that when the tire is inflated to design inflation pressure and loaded the ply 18 does not contribute substantially to the restricting action of the belt structure 14. This is accomplished by placing the high modulus cords 24 in a curved or sinuous path within the unvulcanized third belt 18, as best seen in FIG. 3. Alternatively, the high modulus cords 24 can be placed in a spiral configuration; e.g., a helix or coil, so as to permit elongation of the ply 18 during the toroidal shaping of the tire 5. The spiral configuration contemplated is to be distinguished from a cord constructed in accordance with Lang's lay wherein the strands of several layers are twisted together in the same direction. A typical cord constructed in accordance with Lang's lay has an approximate elongation of 7.5%; whereas, a cord constructed in accordance with the present invention can elongate approximately 10% or greater. A comparison of FIGS. 2 and 3 reveal that the high modulus cords 24 are partially uncoiled or straightened out during the toroidal shaping of the tire. However, the cords 24 do not uncoil or straighten out sufficiently so as to share in the stress being placed upon the belt structure during operation of the tire. Although the material of construction in filament form may have a modulus of about 250 grams per denier, the modulus of the belt 18 will be considerably less so as to be a substantially non-restricting belt ply.

The radial tire 5 is built by the flat-band method, as best seen in FIG. 4, wherein the previously outlined components in an unvulcanized condition, are successively wrapped around a conventional, cylindrical tire building drum 29. In this particular case, a pair of elastomeric wedge strips 30, 31 are utilized, so that the final curvature of the belt structure 14 is less than that of the adjacent carcass plies 7, 8 as best seen in FIG. 1. A pair of bead reinforcements 32, 33 and a pair of chafer strips 34, 35 are provided for stiffening the bead areas of the tire 5 and protecting the beads 12, 13 against scuffing by the upstanding flanges of the wheel rim on which the tire 5 is mounted.

Thus, there has been provided a radial tire having a unique belt structure reinforced with cords having widely divergent initial moduli of elasticity and a method of building such a tire.

While certain representative embodiments and details have been shown for the purpose of illustrating the invention, it will be apparent to those skilled in this art that various changes and modifications may be made therein without departing from the spirit or scope of the invention.

What is claimed is:

1. A flat built radial pneumatic tire comprising at least one carcass ply, a tread and pair of sidewalls securing the carcass ply, and a belt structure interposed between the tread and carcass ply, characterized in that the belt structure comprises:
   (a) a first layer having at least one belt ply, and
   (b) a second layer having a belt ply reinforced with cords made from a material having an initial modulus of elasticity which is at least 250 grams per denier placed radially outward of said first layer, the belt ply of said second layer being elongatable at least as much as said belt ply of said first layer during the torodial shaping of the uncured tire on the building drum, said belt ply of said second layer when the tire is inflated to design inflation pressure and operated at rated load does not contribute substantially to the restrictive force of said belt structure.

2. The tire according to claim 1 wherein said belt ply of said first layer is reinforced for cords having initial modulus of elasticity not exceeding 120 grams per denier.

3. The tire of claim 1 wherein the cords of said belt ply of said first layer are composed of a material selected from the group consisting of rayon, nylon or polyester.

4. The tire of claim 1 wherein the cords of said belt of said second layer are composed of a material selected from the group consisting of glass, metal and aramid.

5. The tire of claim 1 wherein said first layer comprises of two cut belt plies, the radially outermost belt having its lateral edges within the lateral edges of the radially inner belt.

6. The tire of claim 1 wherein the longitudinal edges of said belt ply of said second layer are placed laterally in and between the laterally longitudinal edges of said belt ply of said first layer.

7. The tire of claim 1 wherein the cords of said belt plies of said first and second layers are disposed at angles in the range from 16–25 degrees measured with respect to the plane containing the mid-circumferential centerline of the tread when the tire is vulcanized and inflated to design inflation pressure of the tire.

8. The tire according to claim 1 wherein the cords of high modulus material of said belt ply of said second layer when the tire is in the configuration which it is built follows a sinuous path.

9. The tire according to claim 1 wherein the cords of high modulus material of said belt ply of said second layer when the tire is in the configuration in which it is built follows a helical path.

10. A flat built radial pneumatic tire comprising at least one carcass ply, a tread and pair of sidewalls surrounding the carcass ply, and a belt structure interposed between the tread and carcass ply, characterized in that the belt structure comprises:
    (a) a pair of superimposed belts, each of which is reinforced with the cords having an initial modulus of elasticity not exceeding 120 grams per denier; and
    (b) a third belt structure surrounding said pair of belts and reinforcement cords made from material having initial modulus of elasticity which is at least 250 grams per denier, the third belt being elongatable at least as much as said pair of belts during the torodial shaping of the uncured tire and when the tire is inflated to design inflation pressure and radial load does not contribute to the restrictive course of said belt structure.

11. The tire of claim 10 wherein the cords of said pair of belts are composed of a material selected from the group consisting of rayon, nylon and polyester.

12. The tire of claim 10 wherein the cords of said surrounding belt ply are composed of a material selected from the group consisting of glass, metal and aramid.

13. The tire of claim 10 wherein each belt of said pair of superimposed belts comprise of two cut belt plies, the radially outermost belt having the lateral edges within the lateral edges of the radially inner belt.

14. The tire of claim 10 wherein the longitudinal edges of the radially outermost third belt placed laterally in and between the laterally innermost longitudinal edges of said pair of belts.

15. The tire of claim 10 wherein the cords of the belt plies of said belt structure are disposed at angles in the range of from 16–25 degrees measured with respect to the plane containing the mid-circumferential centerline of the tread, when the tire is vulcanized and inflated to design inflation pressure of the tire.

16. The tire according to claim 10 wherein the cords of high modulus material of the third belt when the tire is in the configuration in which it is built follows a sinuous path.

17. The tire according to claim 10 wherein the cords of high modulus material of the third belt when the tire is in the configuration in which it is built follows a helical path.

18. A method of building a radial tire on a flat band building drum, comprising the steps of:
 (a) successively wrapping around said building drum at least one carcass ply, a belt structure and a tread, the belt structure comprising,
  (i) at least one belt reinforced with textile cords having an initial modulus of elasticity not greater than 120 grams per denier, and
  (ii) another belt ply surrounding the other superimposed belt plies and reinforced with cords made of a material having an initial modulus elasticity which is at least 250 grams per denier, the cords of said belt structure are in a configuration so as to allow the elongation of the cords of said third belt to be at least as much as said cords of said inner belt plies during shaping of the tire such that when the tire is cured, mounted on the rim for which it is designed and inflated to design inflation pressure and at rated load does not contribute substantially to the restrictive force of said belt structure;
 (b) removing the cylindrical tire from the drum and then torodially shaping the tire in a mold in which the tire is molded and vulcanized.

19. The method of claim 18 wherein the textile cords are composed of the material selected from the group consisting of rayon, nylon and polyester.

20. The method of claim 18 wherein the cords of the third belt are composed of a material selected from the group consisting of glass, metal and aramid.

21. Method of claim 18 wherein the high modulus cords of the belt when of said outer belt when the tire is in the configuration which it is built follows a sinuous path.

22. The method of claim 18 wherein the high modulus cords of the belt when the tire is in the configuration in which it is built follows a sinuous path.

23. The method of claim 18 wherein the textile cord reinforced plies is comprised of two cut belts, the longitudinal edges of said belts being lateral beyond the edges of said third belt ply.

* * * * *